US008538744B2

(12) United States Patent
Roberts et al.

(10) Patent No.: US 8,538,744 B2
(45) Date of Patent: Sep. 17, 2013

(54) COMPUTER SYSTEM FOR AUTOMATICALLY ANSWERING NATURAL LANGUAGE QUESTIONS

(75) Inventors: Thomas Roberts, Cambridge (GB);
Paul Butcher, Cambridge (GB);
Dominic Binks, Cambridge (GB);
Frederick Cheung, Cambridge (GB);
Daniel Jaeggi, Cambridge (GB);
Matthew Jacobs, Cambridge (GB)

(73) Assignee: Grape Technology Group, Inc., Bethlehem, PA (US)

( * ) Notice: Subject to any disclaimer, the term of this patent is extended or adjusted under 35 U.S.C. 154(b) by 259 days.

(21) Appl. No.: 12/739,327

(22) PCT Filed: Oct. 22, 2008

(86) PCT No.: PCT/GB2008/050976
§ 371 (c)(1),
(2), (4) Date: Feb. 22, 2011

(87) PCT Pub. No.: WO2009/053739
PCT Pub. Date: Apr. 30, 2009

(65) Prior Publication Data
US 2011/0153312 A1    Jun. 23, 2011

(30) Foreign Application Priority Data

Oct. 23, 2007   (GB) .................................. 0720678.2
Nov. 9, 2007    (GB) .................................. 0722031.2
Jul. 4, 2008    (GB) .................................. 0812207.9

(51) Int. Cl.
*G06F 17/27*    (2006.01)
(52) U.S. Cl.
USPC ..... 704/9; 434/322; 379/265.12; 379/265.06; 379/265.01; 707/999.03; 707/999.05

(58) Field of Classification Search
USPC ........... 704/9; 434/322; 379/265.01, 265.06, 379/265.12; 707/999.03, 999.05
See application file for complete search history.

(56) References Cited

U.S. PATENT DOCUMENTS 5,673,369 A * 9/1997 Kim ................................ 706/59
6,028,601 A * 2/2000 Machiraju et al. ............ 715/705
(Continued)

FOREIGN PATENT DOCUMENTS

EP    06111852.7    6/2006
GB    002057266     2/1995
(Continued)

OTHER PUBLICATIONS

Burke, R., Hammond, K., Kulyukin, V., Lytinen, S., Tomuro, N. & Schoenberg, S. Question Answering from Frequently-Asked Question Files: Experiences with the FAQ Finder System.AI Magazine, 18(2), pp. 57-66, 1997.*

(Continued)

*Primary Examiner* — Douglas Godbold
*Assistant Examiner* — Ernest Estes
(74) *Attorney, Agent, or Firm* — Sofer & Haroun, LLP

(57) ABSTRACT

A computer system is provided for automatically answering natural language questions. The system has an input to receive natural language questions and a data store to record linked pairs of questions and corresponding answers. A matcher is configured to compare a received natural language question with the linked question and answer pairs, and an output transfers the received natural language question to a researcher if no matches are found. The system links pairs of questions and corresponding answers into groups, to enable the generation of a prototypical answer for each group of pairs of questions and answers.

14 Claims, 13 Drawing Sheets

(56) References Cited

U.S. PATENT DOCUMENTS

| | | | |
|---|---|---|---|
| 6,631,377 B2 * | 10/2003 | Kuzumaki | 434/322 |
| 2005/0289130 A1 * | 12/2005 | Cohen et al. | 707/3 |
| 2006/0053000 A1 * | 3/2006 | Moldovan et al. | 704/9 |

FOREIGN PATENT DOCUMENTS

| | | |
|---|---|---|
| GB | 002446870 | 6/1997 |
| GB | 0720678.2 | 2/2008 |
| GB | 0722031.2 | 2/2008 |

OTHER PUBLICATIONS

Hammond, K.; Burke, R.; Martin, C.; Lytinen, S.; "FAQ finder: a case-based approach to knowledge navigation," Artificial Intelligence for Applications, 1995. Proceedings., 11th Conference on, vol., no., pp. 80-86, Feb. 20-23, 1995 doi: 10.1109/CAIA.1995.378787 URL: http://ieeexplore.ieee.org/stamp/stamp.jsp?tp=&arnumber=378787&isnumber=8623.*

Notification of Transmittal of the International Search Report and the written opinion of the International Searching Authority, or the Declaration—dated May 8, 2009.

* cited by examiner

Question: What car was James Dean driving when he died?
Answer:

[ Type answer here ] [ Send ]

Source: [ ]

Automatic search results:
Q: When did James Dean Die?
A: James Dean died in car accident on Sept 30, 1955 while driving on U.S. Highway 466, Cholame, California, when a car veered into his lane.
Source: http://www.americanlegends.com/jamesdean/
Q: When did James Dean Bradfield Die?
A: James Dean Bradfield is the lead guitarist and vocalist for the famous Welsh rock band Manic Street Preachers. He is still alive.
Source: http://www.jamesdeanbradfieldofficial.com/
Q: How many films did James Dean star in?
A: James Dean starred in 8 films including Giant, Rebel Without a Cause, East of Eden, Harvest, Trouble Along the Way and Has Anybody Seen My Gal?
Source: http://imdb.com/name/nm0000015/

[ Re-use ]
[ Re-use ]
[ Re-use ]

Manual search:

[ Type search terms here ] [ Search ]

Figure 6

Listing Question Groups:

| Size | First question in group | | |
|------|------------------------|------|--------|
| 12 | When did James Dean Die? | View | Attach |
| 10 | When does British Summer Time end? | View | Attach |
| 10 | How can I lose weight fast? | View | Attach |
| 8 | Why is Boxing Day called Boxing Day? | View | Attach |

Figure 7

| | Generic question or description of question Group | Prototypical answer |
|---|---|---|
| First question in group: When did James Dean Die? | | |
| Attach | Questions about James Dean's death | James Dean died in car accident on Sept 30, 1955 while driving a Porsche 550 Spyder on U.S. Highway 466, Cholame, California, when a car veered into his lane. |
| Attach | What is the longest word in the dictionary? | Pneumonoultramicroscopicsilicovolcanoconiosis ('a lung disease caused by the inhalation of very fine silica dust') is the longest word in the OED. |
| Attach | Why is the sky blue? | Blue light's short wavelength causes it to get scattered 10x more by oxygen & nitrogen than wavelengths like red. Blue we see is scattered blue light. |
| Attach | What is the most spoken language in the world? | Mandarin Chinese is the most commonly spoken language in the world with 885 million speakers, followed by English (402) + then Spanish (332). |

Figure 8

Descriptor for Question Group: Questions about James Dean's Death
Prototypical Answer: James Dean died in car accident on Sept 30, 1955 while driving a Porsche 550 Spyde r on U.S. Highway 466, Cholame, California, when a car veered into his lane.

Does this answer the following questions?

| Question | Yes | No |
|---|---|---|
| When did James Dean die? | Yes | No |
| Where did James Dean die? | Yes | No |
| What was James Dean driving when he died? | Yes | No |
| When did James DeanBradfield die? | Yes | No |
| Wen did James Dean die? | Yes | No |

Figure 9

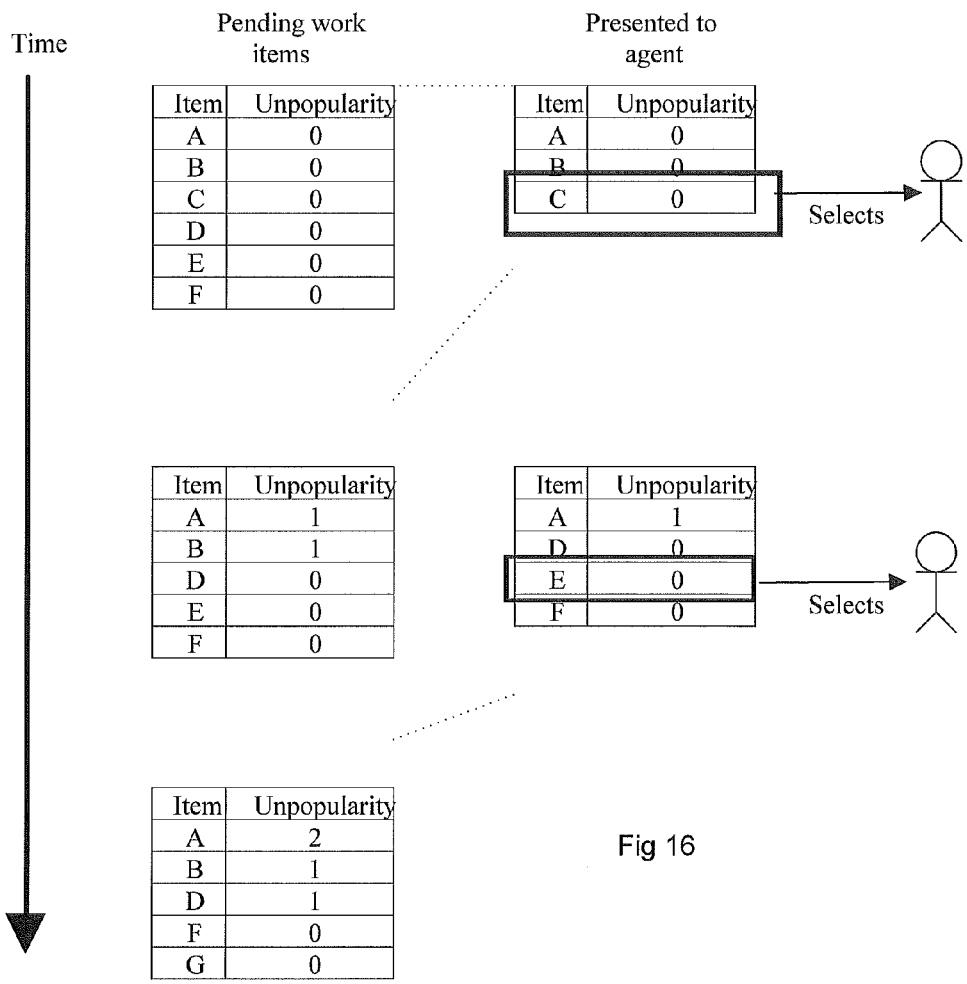

COMPUTER SYSTEM FOR AUTOMATICALLY ANSWERING NATURAL LANGUAGE QUESTIONS

RELATED APPLICATIONS

This application is a National Phase Application of PCT/GB2008/050976, filed on Oct. 22, 2008, which in turn claims the benefit of priority from GB Patent Application Nos. GB 0720678.2, filed on Oct. 23, 2007, GB 0722031.2, filed on Nov. 9, 2007 and GB 0812207.9, filed on Jul. 4, 2008, the entirety of which are incorporated herein by reference.

FIELD OF THE INVENTION

The invention relates to a computer system for automatically answering natural language questions and/or to a computer system for assigning work items, such as natural language questions, to agents, e.g. researchers.

BACKGROUND

The widespread availability of data-enabled mobile devices (primarily, but not exclusively, mobile telephones) has created a demand for access to information while mobile. Traditional internet search solutions do not effectively address this need.

Traditional internet search solutions rely on allowing users to efficiently perform the following iterative sequence:

1. Enter a search term (typically composed of one or more keywords).
   a. This generates a list of search results, typically ranked with "most relevant" first.
   b. Each result consists of a link to the full result together with some summary information.
2. The user examines the search results to see if any appear to contain the information they require.
   a. Sometimes this determination can be made from the summary information displayed for each result alone.
   b. On other occasions the user opens one or more full results in order to examine the full contents.
3. If none of the matches contains the information necessary, the user either:
   a. Views a further tranche of results.
   b. Refines the search term and starts again from step 1 above.

From a technical perspective, mobile devices have a number of limitations:

Slow, high-latency and intermittent network connections.
Small displays (both in terms of resolution and physical size).
Slow and awkward text-entry.
Software (internet browser, document viewers/editors) which has much reduced functionality compared to the equivalents on desktop computers.

These limitations reduce the effectiveness of searching as described above in the following ways:

Each step of the iterative process described above takes longer, dramatically reducing its efficiency. This arises from:
  Slow text-entry meaning that entering search terms takes longer.
  High-latency connections meaning that the time from entering a search term to seeing the results takes longer.
  Slow connections meaning that opening full results takes longer.
  Unreliable connections resulting in the likelihood of one step of the iterative process failing.
Many of the information sources available to search engines have not been optimized for mobile devices, meaning that:
  They may not display correctly.
  The quantity of information displayed may be excessive, making it difficult to "see the wood for the trees".
  They make take an excessively long time to load (further reducing the efficiency of the iterative process).

In addition to the technical reasons above, there are a number of practical/sociological reasons why traditional internet search is inappropriate for mobile use:

In contrast to desktop users who may be simply browsing, mobile users typically have more focussed questions— they want a specific answer to a specific question. Search results do not typically handle this very well:
  The answer may be present somewhere on one of the full results, but typically it will be surrounded by other less relevant (from the point of view of the mobile user) context.
  The information to answer the question may be present, but not phrased as an answer to the question.
  It may be necessary to combine several results to synthesize an answer to the question (e.g. search results for the question "Which is taller, the Eiffel Tower of the Statue of Liberty" may contain a result with the height of one and another with the height of the other, but no result which directly compares the two).
Mobile users typically have much less time to spare and more other considerations competing for their time. In particular they are unlikely to have the time necessary to perform the iterative process outlined above (even without the inefficiencies caused by the limitations of mobile technology).

For all of these reasons, known methods of search are not an appropriate solution to mobile users' information access needs. Furthermore, in general, computers are not yet capable of accurately answering unrestricted natural language questions, although this remains an active research area (illustrated, for example, by the various solutions competing in the annual Text Retrieval Conference (TREC) competition: http://trec.nist.gov/ and the commercial services Powerset http://www.powerset.com/and [true knowledge] http://www.trueknowledge.com/)

The applicant has recognised that there is a need for an improved mobile search method.

Additionally, since computers are not yet capable of accurately answering unrestricted natural language questions, such questions are generally distributed amongst a number of researchers (agents) who research the question and provide an answer. Traditional approaches to distributing work items to agents suffer from inefficiently matching agents' capabilities with work items (e.g. round-robin, in which work items are allocated to agents in turn) or are susceptible to gaming (e.g. differential pricing, in which unpopular work items are associated with a higher price and we rely on market forces to ensure that all work items are handled in a timely manner).

SUMMARY OF THE INVENTION

According to one aspect of the invention, there is provided a computer system for automatically answering natural language questions, the system comprising: an input to receive said natural language questions; a data store to record linked pairs of questions and corresponding answers; a matcher configured to compare a said received natural language question with said linked question and answer pairs and an output to transfer a said received natural language question to a researcher if no matches are found.

The computer system may further comprise a system to link pairs of questions and corresponding answers into groups, to enable the generation of a prototypical answer for each group of pairs of questions and answers and to store said prototypical answers in said data store; wherein said matcher compares a said received natural language question with a question in said data store having an associated prototypical answer and output said associated prototypical answer for said question in response to said matching.

Thus according to another aspect of the invention, there is provided a computer system for automatically answering natural language questions, the system comprising an input to receive said natural language questions, a researcher user interface to present a said question to a researcher and to input an answer to the presented question, and a data store to record pairs of questions and corresponding answers; and further comprising: a system to link pairs of questions and corresponding answers into groups, to enable the generation of a prototypical answer of each group of linked pairs of questions and answers and to store said prototypical answers in said data store, and a system to match a said received natural language question with a question in said data store having an associated prototypical answer and to output said prototypical answer for said natural language question in response to said matching.

Alternatively, the matcher may be configured to output all linked question and answer pairs which match said received natural language question and the system may further comprise an input to receive a request to transmit a specific natural language question to a researcher and wherein said output transmits said specific natural language question to a researcher in response to said request.

Thus, according to another aspect of the invention, there is provided a computer system for automatically answering natural language questions, the system comprising an input to receive said natural language questions; a data store to record linked pairs of questions and corresponding answers; a matcher configured to compare a said received natural language question with said linked question and answer pairs in said data store and to output all said linked question and answer pairs which match said received natural language question; an input to receive a request to transmit a specific natural language question to a researcher; an output to transmit said specific natural language question to a researcher; wherein said data store is configured to receive an answer from said researcher to said specific natural language question, to store said question and received answer as a linked pair in said data store and to output said question and received answer.

In other words, in both situations the computer system automatically answers the subset of natural language questions for which similar question/answer pairs are stored. In one embodiment, this subset of such questions is associated with prototypical answers. If no matching question/answer pairs are stored; a researcher may provide an answer which is added to the database to increase the subset of questions which may be answered completely automatically.

Zipfs Law states that in a corpus of natural language utterances, the frequency of any word is roughly inversely proportional to its rank in the frequency table. In addition to word frequency, Zipfs Law turns out to be (approximately) true for many other natural language phenomena. In particular it is (approximately) true of the questions which people ask of a system such as the one we are concerned with here.

A consequence of Zipf's Law is that a relatively small set of questions account for a relatively large proportion of the total number of questions asked. These questions are asked repeatedly, in subtly different forms. Examples of such popular questions might include:

Which came first, the chicken or the egg?
What is the weather forecast for tomorrow?
When did Elvis Presley Die?
When do the clocks go back?

Thus by automatically answering such frequently asked questions, it is possible to have a disproportionately large effect on the number of questions which are answered automatically.

The subset of questions to which this system is applicable is those for which the answer is not time-sensitive (i.e. the correct answer to the question yesterday will be the correct answer today). This system will not, therefore, handle "What is the weather forecast for tomorrow?" It will, however, handle "Which came first, the chicken or the egg?" and "When did Elvis Presley Die?" It may also be extended to handle questions which are weakly time sensitive such as "When do the clocks go back?" (the answer to this question does change over time, but remains constant for extended periods).

The system may be configured to determine whether a question received by the system is time dependent, for example using an automatic agent. The system may further comprise means to query a real-time data feed to generate an answer to a time dependent question. The query means may be a second automatic agent or may be incorporated in the first automatic agent.

A natural language parsing system may be used to determine whether a question is time dependent and may be trained using said database of linked question and answer pairs. The natural language parsing system may be trained to recognise the compact and stylised text language commonly used by mobile users.

The system to link pairs of questions and corresponding answers may be configured to construct a disconnected directed graph of said pairs of questions and corresponding answers and may be configured to establish a transitive closure of said graph to identify a group of candidate said pairs of questions and corresponding answers to be answered by a said prototypical answer. In this way, the system automatically identifies question/answer pairs for which a prototypical answer may be generated.

The system to link pairs of questions and corresponding answers may further include a moderator user interface to present a group of linked pairs of questions and corresponding answers to a moderator for review. The moderator user interface may enable a moderator to identify said prototypical answer from amongst said answers of the linked pairs of questions and answers within said group. Said prototypical answer may reuse one of the answers in its current format, may combine two or more answers in the group or may modify an answer in the group to include additional information. Occasionally a prototypical answer may be generated from scratch. Once a prototypical answer is created, said prototypical answer is stored in said data store in association with said corresponding group of linked pairs of questions and answers.

The moderator user interface may be further configured to enable said moderator to validate whether each question in each said group of linked said pairs of questions and answers is to be answered by said prototypical answer which is associated with said group. The system to link pairs of questions and corresponding answer may store whether or not a question is validated and may be configured to retain questions within said group having an associated prototypical answer which are not to be answered by said prototypical answer in said group and to flag said questions as not to be answered by said prototypical questions.

A record of a source used to construct each linked pair of questions and answers may also be stored in said data store. This may be particularly useful, if said prototypical answer is created by modifying an answer in the group to include additional information since the source of the answer to be modified is likely to provide the required additional information. Similarly, if said prototypical answer is to be created from scratch by a researcher, the source of the answers for the questions in the group may be useful.

According to another aspect of the invention, there is provided a method of automatically answering a natural language question, the method comprising processing a data store of pairs of natural language questions and corresponding answers; inputting said natural language question; matching said natural language question to said stored natural language questions, outputting all matches from said matching step and transmitting a specific natural language question to a researcher, if no match is found.

The method may comprise grouping said natural language questions and generating a prototypical answer for said grouped questions or receiving a request to transmit said specific natural language question to a researcher and transmitting said specific natural language question in response to said request.

According to another aspect of the invention, there is provided a method of automatically answering natural language questions, the method comprising using a computer system to process a data store of natural language questions and corresponding answers to group said natural language questions and to generate a prototypical answer for said grouped questions; and automatically answering a natural language question using said prototypical answer.

According to another aspect of the invention, there is provided a method of automatically answering a natural language question, the method comprising processing a data store of linked pairs of natural language questions and corresponding answers into groups and generating a prototypical answer for each group of linked questions and answers; inputting said natural language question; matching said natural language question to said stored natural language questions and automatically answering said natural language question using said prototypical answer where a match is found.

The data store of natural language questions and corresponding answers may be processed by constructing a disconnected directed graph of said pairs of questions and corresponding answers. A transitive closure of said graph may be established to identify a group of said pairs of questions and corresponding answers to be answered by a said prototypical answer.

Generating each of said prototypical answers may comprise inputting a group of linked pairs of questions and corresponding answers to a moderator for review and receiving said prototypical answer from said moderator. The group may be input via a moderator user interface which may be configured to enable a moderator to identify said prototypical answer as described above.

Each question in a group of questions may be validated to ensure that said prototypical answer correctly answers each said question. Validating may comprise inputting each question and prototypical answer to said moderator for review, receiving information from said moderator whether each question is to be answered by said prototypical answer and storing said information.

Said natural language question may be outputted to a researcher if there is no matching stored natural language question. The method may then comprise receiving an answer from said researcher, sending the answer to the questioner, and updating said data store to include said question and received answer as a linked pair in said data store.

The received answer from said researcher may re-use an answer from a linked pair of question and answer stored in the data store. In this case, the method may further comprise grouping the input natural language question with the question in the data store having the answer which has been re-used and generating a prototypical answer for said grouped input question and reused question.

A record of a source used to construct each pair of questions and answers may also be stored in said data store. This source may be displayed to a user with match results or to a researcher. This has the advantage that in the event that none of the match results directly answers the user's question, the user may open the original source which may contain the information necessary to provide an answer. Alternatively, this is particularly useful if a researcher is able to reuse part of an answer stored in the database since the sources used to construct such a stored answer are likely to form a good starting point for researching said input question.

According to another aspect of the invention, there is provided a method of automatically answering a natural language question processing a data store of linked pairs of natural language questions and corresponding answers; inputting said natural language question; matching said natural language question to said stored linked pairs of natural language questions and corresponding answers; outputting all linked pairs of natural language questions and corresponding answers which match said received natural language question; transmitting a specific natural language question to a researcher, if a request to transmit said specific natural language question to a researcher is received after said outputting step; receiving an answer from said researcher to said specific natural language question, updating said data store to include said question and received answer as a linked pair in said data store and outputting said question and received answer.

Each method may comprise determining whether a question received by the system is time dependent and may further comprise querying a real-time data feed to generate an answer to a time dependent question. The determining may use a natural language parsing system which may be trained using said database of linked question and answer pairs.

According to another aspect of the invention, there is provided a computer system for automatically answering natural language questions, the system comprising: an input to receive said natural language questions; means to determine whether said input national language questions are time dependent; query means to extract answers to time dependent questions from real-time data feeds; an output to transmit said extracted answers; an input to receive a request to transmit a specific natural language question to a researcher; an output to transmit said specific natural language question to a researcher; wherein said data store is configured to receive an answer from said researcher to said specific natural language question and to output said received answer.

The system may further comprise a data store to record linked pairs of questions and corresponding answers and a matcher configured to compare a said received natural language question with said linked pairs of questions and answers in said data store and to output all linked pairs of questions and answers which match said received natural language question.

According to another aspect of the invention, there is provided a method of automatically answering a natural language question, the method comprising inputting said natural language question; determining whether said input question is time dependent; extracting answers to time dependent questions from real-time data feeds; outputting said extracted answers; transmitting a specific natural language question to a researcher, if a request to transmit said specific natural language question to a researcher is received after said outputting step; receiving an answer from said researcher to said specific natural language question, updating said data store to include said question and received answer as a linked pair in said data store and outputting said received answer.

Any of the computer systems and/or methods described above may be further adapted to fairly distribute natural language questions (i.e. work items) to be answered to researchers (i.e. agents). The system thus may further comprise a server configured to assign unpopularity scores to each of said natural language questions; a plurality of researcher work stations each having an researcher user interface, and a communications network connecting said server to said plurality of researcher work stations; wherein each researcher user interface presents a plurality of said natural language questions to a researcher and wherein said server is configured to assign a value to each researcher based on the unpopularity score of each natural language questions selected by said researcher.

According to another aspect of the invention, there is provided a computer system for distributing work items to be dealt with by agents, the system comprising: an input to receive said work items; a data store to store said work items; a server configured to assign unpopularity scores to each of said work items; a plurality of agent work stations each having an agent user interface, and a communications network connecting said server to said plurality of agent work stations; wherein each agent user interface presents a plurality of said work items from said data store to an agent and wherein said server is configured to assign a value to each agent based on the unpopularity score of each natural language question selected by said agent.

According to another aspect of the invention, there is provided a method of distributing work items to agents, the method comprising: inputting said work items to a server; storing said work items in a data store on said server; configuring said server to assign unpopularity scores to each of said work items; connecting, via a communications network, said server to a plurality of agent work stations each having an agent user interface; presenting a plurality of said work items to an agent on an agent user interface; and configuring said server to assign a value to each agent based on the unpopularity score of each natural language question selected by said agent.

In each of these aspects, the work items may be natural language questions to be answered by an agent in the form of a researcher. Accordingly, the agent user interface may be a researcher user interface.

The researcher user interface may display an indication of the unpopularity score of each presented question and/or an indication of the value of the researcher. The indication of said unpopularity score and/or value may be presented graphically or numerically.

The researcher user interface may present all unanswered natural language questions or a subset thereof to a researcher. The subset of presented questions may be determined by considering some or all of the following factors Said unpopularity scores Other attributes (e.g. identity, past performance, previously expressed preferences for types of questions, etc.) of said researcher The length of time that the unanswered questions have been stored in the data store Other attributes of the unanswered questions (e.g. type, expected time to complete, etc.)

According to another aspect of the invention, there is provided a researcher user interface for displaying a plurality of questions to a researcher, said researcher user interface comprising a display indicating the unpopularity score of each displayed question, a button adjacent each question for a researcher to select said question, and a display indicating of the value of each researcher based on the unpopularity score of each natural language question selected by said researcher.

The researcher user interface may display the unpopularity score and/or value of each researcher as a graphical display, e.g. icon, a numerical display, a percentage and/or a ratio. The server typically assigns an initial unpopularity of zero to each question, but a question may be assigned a higher initial unpopularity if appropriate (e.g. the question is in a category known to be unpopular). The system may subsequently increase the unpopularity value of each question by tracking when a question is presented to a researcher and not answered. The amount by which the unpopularity value is increased may vary according to various factors including (but not limited to):

question type (certain types of questions may have their unpopularity increased by more or less than others)

the position of each question in the list of questions presented to the researcher and/or its position relative to the question which was selected. For example, it may be that questions above the selected question have their unpopularity score increased by one unit whereas for the questions below the selected question, their unpopularity score are unchanged.

The server may be configured to calculate said value as a time-weighted combination of the unpopularity scores of each question selected by that researcher over a particular time frame. The particular time frame may be measured in minutes, hours or days. Said unpopularity scores may be combined according to a time decay function. The time decay functions may be a step function, a linear decay function or a more complicated time decay function, e.g. elliptical or exponential.

The server may assign an initial value of zero to each researcher when each researcher begins working. This means that the value of each researcher as they begin working is likely to fall below a threshold determined from consideration of all researchers. Action may thus need to be taken to ensure that the researcher is not penalised until they have had a chance to increase their value up to a suitable level. In these circumstances, the system may use a modified time decay function for such researchers. Alternatively, the system may assign an initial value based on a selection of questions of average unpopularity in the recent past.

If there are only a few questions with a non-zero unpopularity score (e.g. because few questions are available or because researchers are conscientiously selecting questions before they have a chance to become unpopular), these few questions may have a disproportionate effect. Accordingly, the system may have a "minimum cumulative unpopularity" threshold below which the server determines there is insufficient data available to be able to present any useful information on unpopularity scores and researcher values on the researcher user interfaces. The minimum cumulative unpopularity threshold may be the sum of all unpopularity scores of questions stored in the data store in the recent past, e.g. within the last hour. In other words, if few questions with non-zero popularity scores exist, the system for distributing work items is temporarily disabled and only work items, without values or scores, are presented on the agent user interfaces. Nevertheless, the server continues calculating agent values and work item unpopularity scores whilst the summed scores are below the threshold and reactivates the system once the summed scores rise above the threshold.

In practice, simply calculating and displaying a researcher's value seems to be sufficient to ensure that questions are distributed fairly. Only rarely is it necessary for the system to restrict the questions presented to a researcher because each researcher typically ensures that their value remains acceptable. Accordingly, under normal circumstances the researcher's value (current level) is not taken into account when determining which questions to present to the researcher. However, the server may be also configured to determine if a researcher's level relative to the average of all researchers drops below an acceptable threshold and restrict the questions presented to that researcher (e.g. only present questions which would increase the researcher's value) until the researcher's value rises above the acceptable threshold.

At least one aspect of the invention thus provides an automatic software system and method which enables questions (otherwise known as items of work) to be objectively, transparently and fairly distributed between researcher (otherwise known as agents). The system may be termed a "leveller". The system distributes questions fairly even if the questions arrive unpredictably and/or vary in size, difficulty and attractiveness. The system ensures that questions are handled in a timely fashion since it is undesirable for a work item to remain in the queue for an extended period. By calculating the values and unpopularity scores on a server, the calculations may be done in real-time and do not slow down the allocation of work items. Furthermore, the system allows agents to act independently and in their own best interests. Individual agents have unique capabilities and preferences (and therefore a question which is unattractive for one agent might be attractive for another).

In contrast to known systems, the system according to the invention provides the agents with a degree of choice (so that, where possible, questions are matched to agents' capabilities) whilst ensuring that unpopular items do get handled in a timely fashion and are fairly distributed among the agents. The system thus automatically tracks unpopular work items and ensures that each agent takes its "fair share" of unpopular work items.

According to another aspect of the invention, there is provided a computer system for answering a natural language question submitted by a client comprising the computer system for assigning questions to said researchers as described above and a communications network linking said computer system to said client to transmit an answer to said client.

The systems described above generally operate in response to questions asked by questioners (or customers) and are independent of the exact transport used to transmit the questions to the system. Potential transports include, but are not limited to, Short Messaging Service (SMS), e-mail and voice messages (which are converted to text through voice-to-text technology or human transcription). Subsequent answers may be delivered to the questioner over a similar range of transports. Note that it is not necessary for the answer to a question to be delivered via the same transport.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

BRIEF DESCRIPTION OF THE FIGURES

FIG. 6 is a sample user interface for a researcher during question answering;

FIG. 7 is a user interface for viewing question groups;

FIG. 8 is a user interface for attaching a question group to a prototypical answer;

FIG. 9 is a user interface for validating question group members against prototypical answer;

FIG. 16 is an example of evolution of work item unpopularity over time;

FIG. 18 is an example of a user interface displaying an agent's current threshold and a graphical indication of work item unpopularity.

DETAILED DESCRIPTION

FIGS. 1 to 9 show how one computer system for automatically answering natural language questions operates in response to questions asked by questioners (or customers). The system is independent of the exact transport used to transmit these questions to the system. Potential transports include, but are not limited to, Short Messaging Service (SMS), e-mail and voice messages (which are converted to text through voice-to-text technology or human transcription). Subsequent answers are delivered to the questioner over a similar range of transports. Note that it is not necessary for the answer to a question to be delivered via the same transport.

Figure 1:
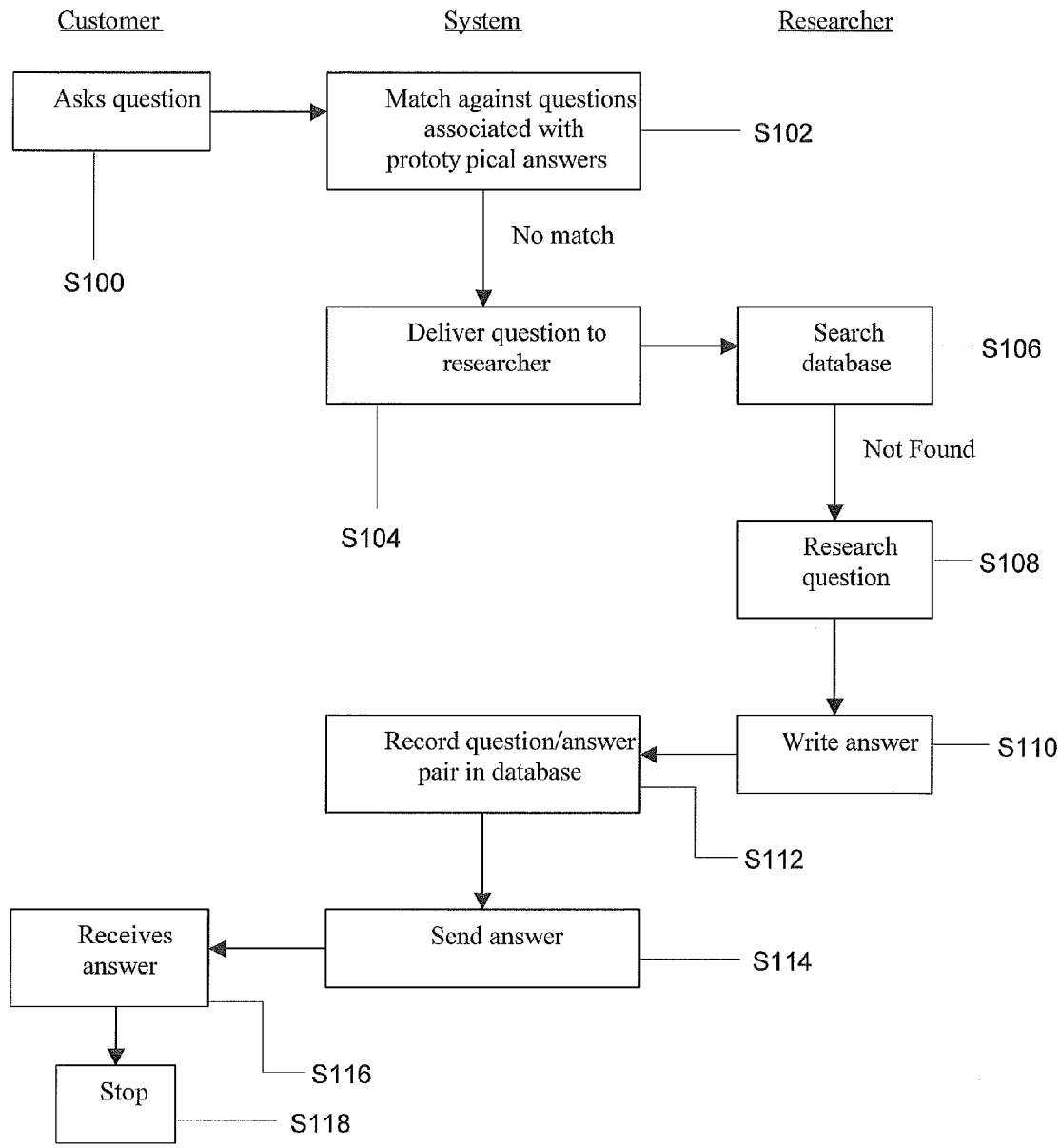
FIG. 1 is a flowchart showing a first manual question answering process.

FIG. 1 shows the initial stages of formation of a database which is used to automatically answer questions. Initially, questions are answered entirely by human researchers, but a database of all question/answer pairs is maintained. At step S100, a customer asks a question which is transmitted to the system. At step S102, an attempt is made to match the question to questions associated with prototypical answers. More information on this matching step is set out in relation to FIG. 4. In the initial stages depicted in FIG. 1, no matches are found and at step S104, the question is delivered to a researcher. At step S106, the researcher searches the database of all question/answer pairs. This search may be automatic (i.e. the researcher may be provided with a list of possible matches arising from an automatically generated search term derived from the incoming question), manual (i.e. the researcher may search the database themselves using manually created search terms) or a combination of both. This system is independent of the precise mechanism used to search the database. Such algorithms include, but are not limited to, simple "bag of words" searching or Term Frequency-Inverse Document Frequency (TF-IDF) searching.

As with the search at step S102, since the database is in the early stages of formation, no matches are found. Accordingly, at step S108 the researcher researches e.g. using textbooks, internet or other similar sources, an answer to the question and writes an answer at step S110. At step S112, the question/answer pair is recorded in the database. As explained in more detail in relation to FIG. 6, a record of the source used to construct the answer is also retained at step 112. The source used to construct a particular question/answer pair is likely to form a good starting point for researching a similar question. The answer is sent at step S114 and received by a questioner (customer) at step S116 and the system stops at step S118.

Figure 2:
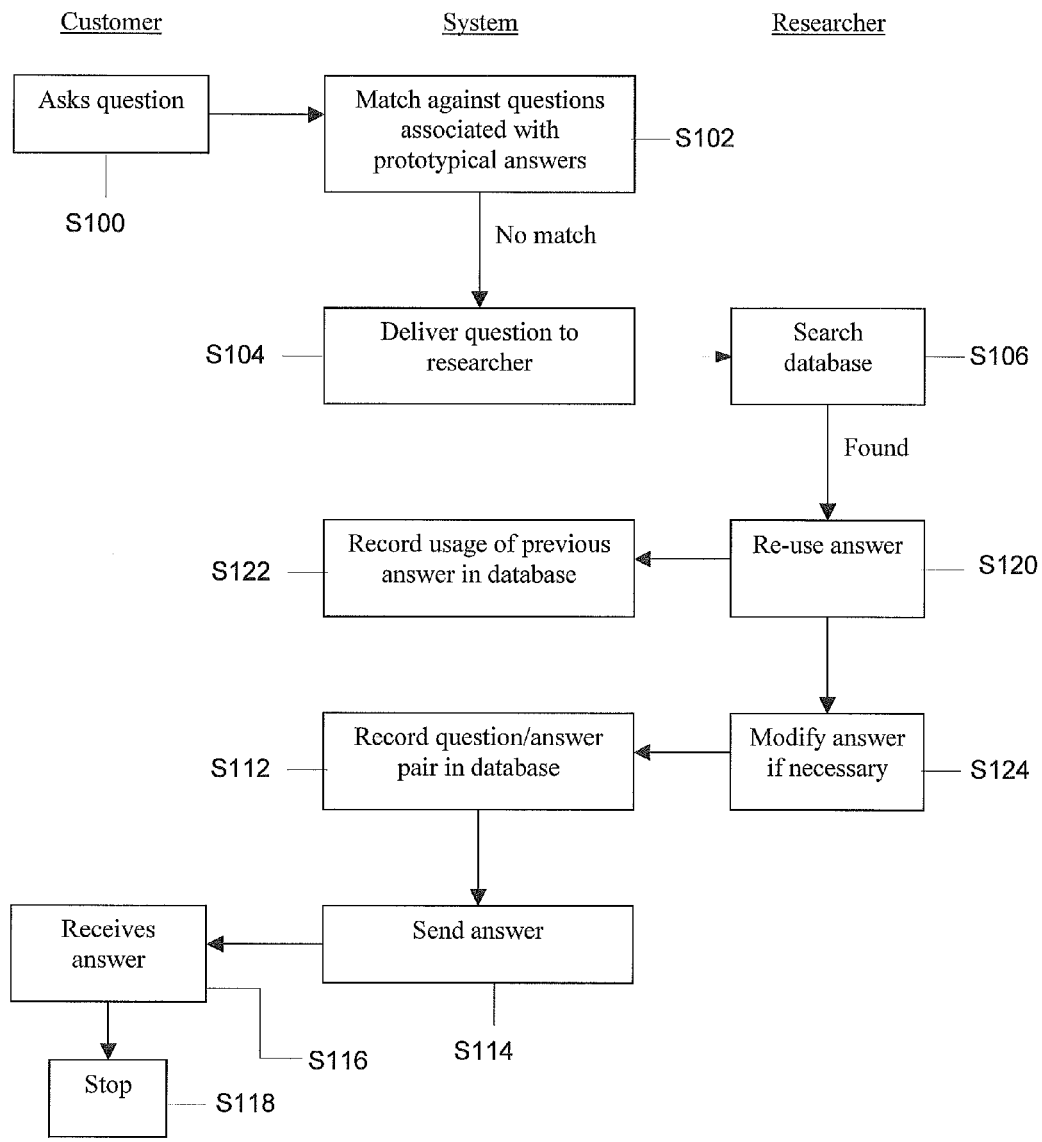
FIG. 2 is a flowchart showing a modification of the process of FIG. 1 with reuse of previous answer.

FIG. 2 shows a variation of the system shown in FIG. 1 with identical steps having the same numbers. As in FIG. 1, at step S106, a researcher searches the database of all question/answer pairs, a match is found. Accordingly, the research step S108 is replaced by step S120 in which the found answer is reused. As shown at step S124, answers may be reused exactly as-is, or modified before being delivered to the questioner. For example, if the following question/answer pair exists in the database:

Q: When did James Dean die?
A: James Dean died in car accident on Sep. 30, 1955 while driving on U.S. Highway 466, Cholame, Calif., when a car veered into his lane.

At step S124, a researcher may choose to reuse this answer while working on the question "What car was James Dean driving when he died?" modifying the answer to read (modifications in italics):

James Dean died in car accident on Sep. 30, 1955 while driving a *Porsche 550 Spyder* on U.S. Highway 466, Cholame, Calif., when a car veered into his lane.

Figure 3A:
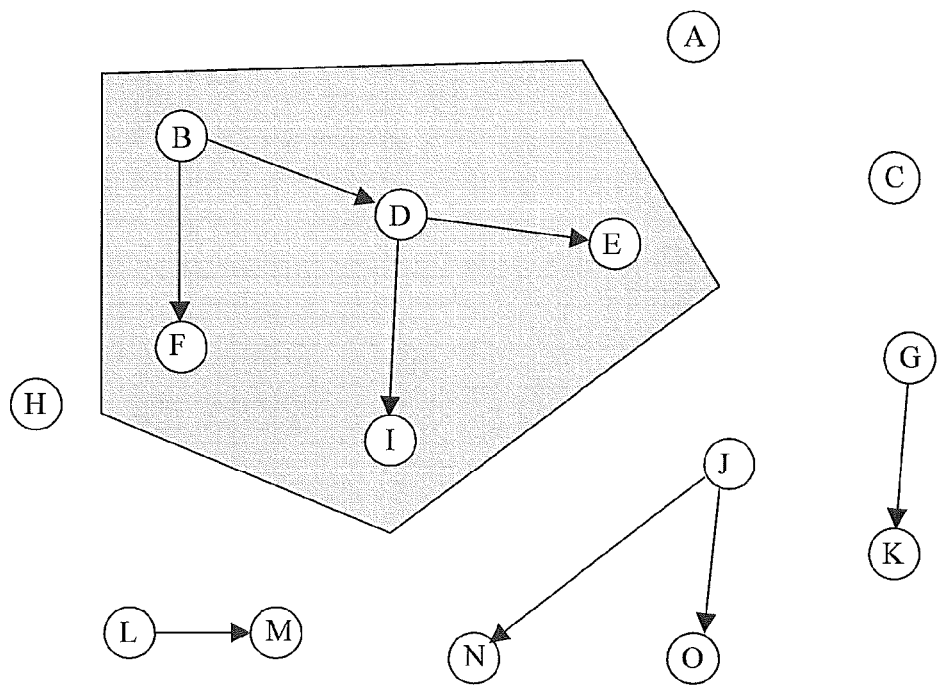
FIG. 3a is a disconnected directed graph with each node representing a question/answer pair with a transitive closure of node B marked thereon.

As shown at step S122, whenever a researcher chooses to reuse a previous answer, a record of the fact that they have chosen to do so is maintained. This creates a relationship between the previous question/answer pair and the new question/answer pair. Over time, these relationships will build into a disconnected directed graph as shown in FIG. 3a where each node (A, B, C etc.) in the graph is a question/answer pair and each arc indicates reuse of a previous answer, e.g. answer J is reused in question/answer pairs O and N.

From this graph, a set of "question groups" is automatically derived, where each question group is a set of question/answer pairs formed from the transitive closure of the graph described above. The transitive closure C(G) of a graph is a graph which contains an edge (u, v) whenever there is a directed path from u to v. The transitive closure for node B is highlighted. This is a fully automated step.

The question groups can be generated asynchronously or in real-time as new question/answer pairs are added to the database. The formulation of disconnected directed graphs for question and answer pairs is a technical effect enabling creation of the prototypical answers.

Figure 3B:
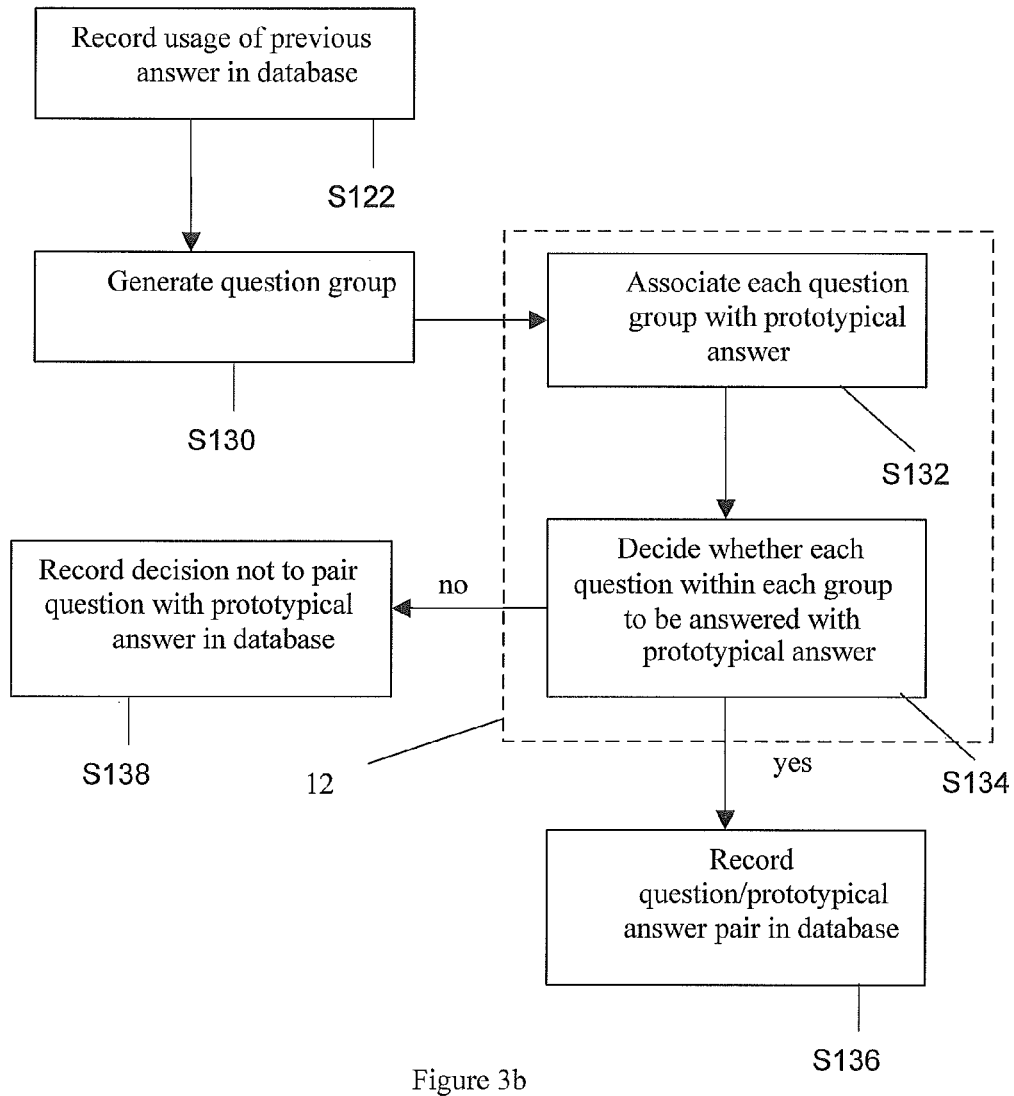
FIG. 3b is a flowchart showing how a moderator associates a prototypical answer with a question.

As shown in FIG. 3b, once question groups have been created at step S130, they are presented to a moderator 12 who can associate each group with a "prototypical answer" as at step S132.

An example question group might be:
Q: When did James Dean die?
A: James Dean died in car accident on Sep. 30, 1955 while driving on U.S. Highway 466, Cholame, Calif., when a car veered into his lane.
Q: Where did James Dean die?
A: James Dean died in car accident on Sep. 30, 1955 while driving on U.S. Highway 466, Cholame, Calif., when a car veered into his lane.
Q: What was James Dean driving when he died?
A: James Dean died in car accident on Sep. 30, 1955 while driving a Porsche 550 Spyder on U.S. Highway 466, Cholame, Calif., when a car veered into his lane.
Q: When did James Dean die?
A: James Dean died in car accident on Sep. 30, 1955 while driving on U.S. Highway 466, Cholame, Calif., when a car veered into his lane.
Q: When did James Dean Bradfield die?
A: James Dean Bradfield is the lead guitarist and vocalist for the famous Welsh rock band Manic Street Preachers. He is still alive.

This group might be associated with the following example prototypical answer, i.e. an answer which provides all the details in the answers which have a degree of overlap:

James Dean died in car accident on Sep. 30, 1955 while driving a Porsche 550 Spyder on U.S. Highway 466, Cholame, Calif., when a car veered into his lane.

In this case, the prototypical answer is created by selecting the answer to the third listed question/answer pair. Alternatively, several answers from the group may be combined or a new prototypical answer created from scratch.

Having associated a question group with a prototypical answer, for each member of group the moderator 12 decides at step S134 whether it should or should not be answered using the prototypical answer. If the answer is yes, this decision is recorded within the database at step 5136, creating a mapping from questions to prototypical answers. If the answer is no, this decision is also recorded within the database at step S138.

In the above example, the following questions should be mapped to the prototypical answer:
When did James Dean die?
Where did James Dean die?
What was James Dean driving when he died?
When did James Dean die?

And the following should not:
    When did James Dean Bradfield die?
The moderator of FIG. 3b may be adapted to ensure that weakly time-sensitive questions to be identified and answered automatically. Examples include:
    When is Easter this year?
    What is the fastest car in the world?
This can be achieved by associating an expiration date (or equivalent mechanism such as a "Time To Live") with prototypical answers. Once this period has expired, questions associated with the prototypical answer will not be automatically answered until the moderator has re-validated the prototypical answer. This might involve simply resetting the expiration date, changing the prototypical answer, changing which questions are flagged as being correctly answered by the prototypical answer or any combination thereof.

Figure 4:
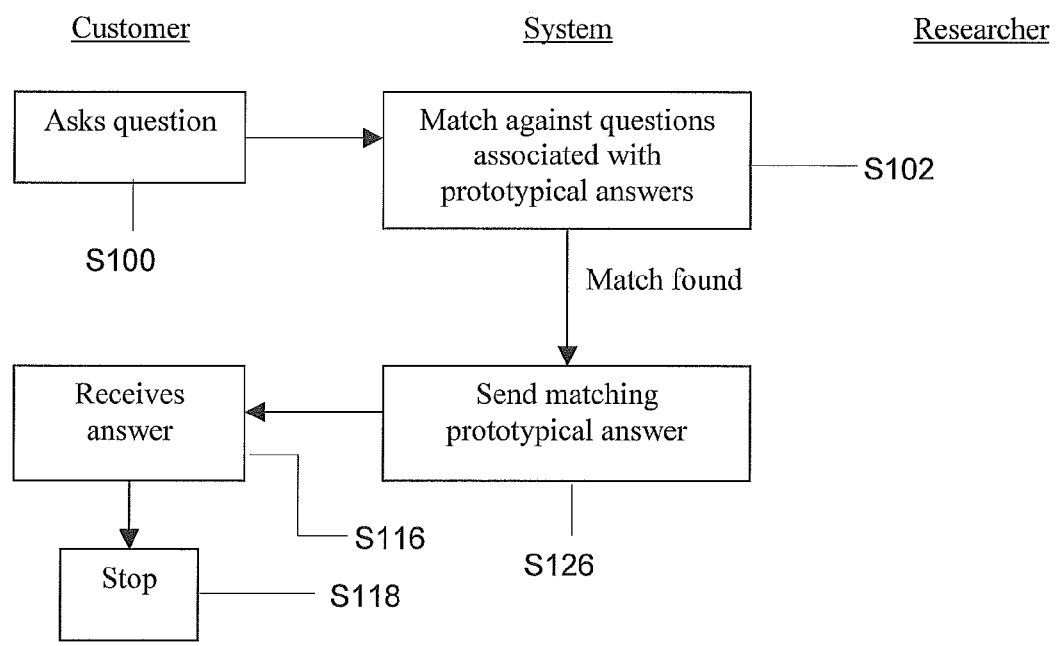
FIG. 4 is a flowchart showing an automatic question answering process derived from FIGS. 1 to 3.

As explained in FIGS. 1 and 2, when a new question arrives, it is matched against all questions which are mapped to a prototypical answer. In FIGS. 1 and 2, no matches are found and human involvement is required to answer the question. However, as shown in FIG. 4, if the question matches, at step S126 the relevant prototypical answer is sent automatically. No human involvement is required. Thus, the stored prototypical answers enable automated responses to natural language questioning with the benefit of improved efficiency and effectiveness of using prototypical answers leading to a faster response to questioning.

The system is independent of the precise matching algorithm used. Options include a simple keyword-based search, TF-IDF http://en.wikipedia.org/wiki/Tf-idf, or more sophisticated approaches based upon Information Retrieval htt://en.wikipedia.org/wiki/information_retrieval technology. The simplest would be a character-by-character match, but more sophisticated algorithms may be used including, but not limited to, case insensitive matching, substitution of equivalent character sequences (e.g. "and" with "&") or matching algorithms based on a Natural Language Processing (NLP) derived analysis of the syntax and/or semantics of the incoming question and stored linked question and answer pairs.

Over time, new question/answer pairs will be added to question groups (e.g. "What is the date of James Dean's death?"). These new questions will be passed to the moderator as described in relation to FIGS. 3a and 3b. If the new questions are mapped to the prototypical answer, these questions may be considered to be validated. These validated questions will subsequently be answered automatically (if appropriate, i.e. if not date dependent).

Regardless of which matching algorithm is being used, the moderator will not be asked to re-validate questions which match previously validated questions or questions which match those questions flagged as not being appropriate to the prototypical answer. Over time, the system will create an increasingly large corpus of questions which can be automatically answered together with an increasingly large corpus of answers to those questions.

Figure 5:
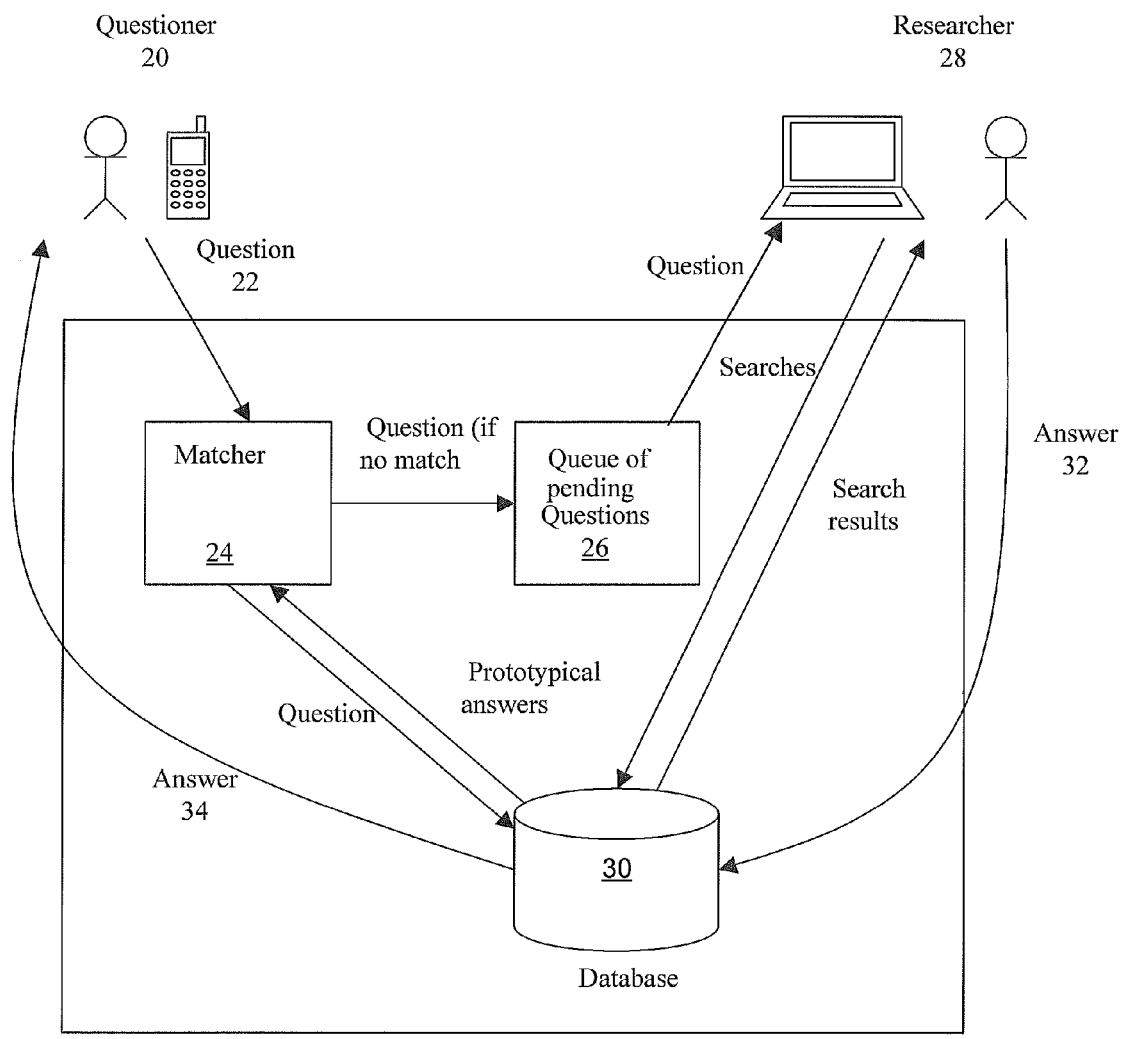
FIG. 5 is a schematic drawing of the overall system architecture for the process of FIG. 3.

FIG. 5 shows the overall system architecture implementing the methods described in FIGS. 1 to 4. A questioner 20 sends a question 22 (in this case using a mobile phone network) to the system 24. The question 22 is sent to a matcher 24 which matches the incoming question against questions associated with prototypical answers stored in a database 30. If there is a matching question, the answer 34 (a prototypical answer in this case) is sent direct from the database 30 to the questioner 20 as described in relation to FIG. 4 above.

If there is no matching question, the incoming question 22 is added to a queue of pending questions 26 which are sent to a researcher 28 (as illustrated by use of a computer network).

The researcher 28 initiates a search of the database 30 of question/answer pairs and may use the results of this search to generate an answer 32 as described in relation to FIGS. 1 and 2 above. The answer 32 generated by the researcher 28 is sent to the database 30 and the answer 34 (in this case a researcher generated answer) is sent from the database 30 to the questioner 20.

FIG. 6 is a sample user interface for a researcher during question answering. The incoming question is shown at the top of the interface. The results of the search of the database of question/answer pairs are shown below and each search result has an associated "re-use" button 40 which a researcher may select if the answer shown is appropriate for the incoming question. As shown in FIG. 6, none of the question and answer pairs delivered by the search may be re-used in their current format to answer the incoming question. However, the answer to the first question/answer pair may be used in a modified format which contains some additional information. Accordingly, the process described in FIG. 1 applies in that a researcher must conduct additional searches to find the answer to the incoming question, for example by inputting search terms into the manual search box 42 and selecting the associated search button 44.

The searching process is simplified because as well as the text of the answer, a record of the source used to construct the answer is also retained at step 112 in FIGS. 1 and 2. The source used to construct a particular question/answer pair is likely to form a good starting point for researching the current question. For example, a page containing the details of when and where James Dean died is very likely to also contain the information about what he was driving when he died. This is another major benefit of reusing a previous answer. Once the researcher has located the additional information required to answer the question, the researcher types the answer in the box 46 below the incoming question, adds details of the source of the information in box 47 and hits the associated send button 48.

FIG. 7 is a user interface for a user, particularly the moderator, to view question groups. The user interface shows the size (number of questions) of the group together with the first question in each group. A moderator may view all questions in each question group by selecting the associated "view" button 50. Hitting the "attach" button 52 transfers the user to an interface (e.g. the one shown in FIG. 8) to enable the user to associate each group to a prototypical answer.

FIG. 8 is a user interface to enable a moderator to attach a new question group to prototypical answer. The user interface shows the first question in the new question group at the top of the interface. Below this question, where possible a sample or generic question from each known question group and its corresponding prototypical answer is shown. If the question group does not contain a generic question and description of the question group is used, e.g. questions about James Dean's death. If one of the known prototypical answers provides the answer to the first question in the new question group, the moderator attaches the new question group to a known question group by simply selecting the "attach" button 54 adjacent each known question group. If none of the known prototypical answers is applicable to the group nor provides sufficient information to answer the first listed question in the group, a user selects the "create new prototypical answer" button.

As explained in FIG. 3b, once a question group is associated with a prototypical answer, the moderator validates each question in the group against the prototypical answer. FIG. 9 show a user interface to enable the moderator to validate question group members against a prototypical answer. The title of the question group, in this case "questions about James Dean's death" and the prototypical answer are shown at the top of the interface. Below this each question in the group is listed with associated "yes" and "no" buttons. If the question is answered by the prototypical answer, the moderator selects the associated "yes" button 56, thereby validating the question (as at step S136 in FIG. 3b). If the question is not answered by the prototypical answer, the moderator selects the associated "no" button 58, thereby flagging the question as one of the questions which should not be automatically answered with the prototypical answer (as at step S138 in FIG. 3b). The question/answer pair remains in the group.

FIGS. 10a to 12 show how an alternative hybrid manual/automatic question answering system for answering natural language questions operates in response to questions asked by questioners (or customers). As explained above, the systems are independent of the exact transport used to transmit these questions to the system.

Figure 10A:
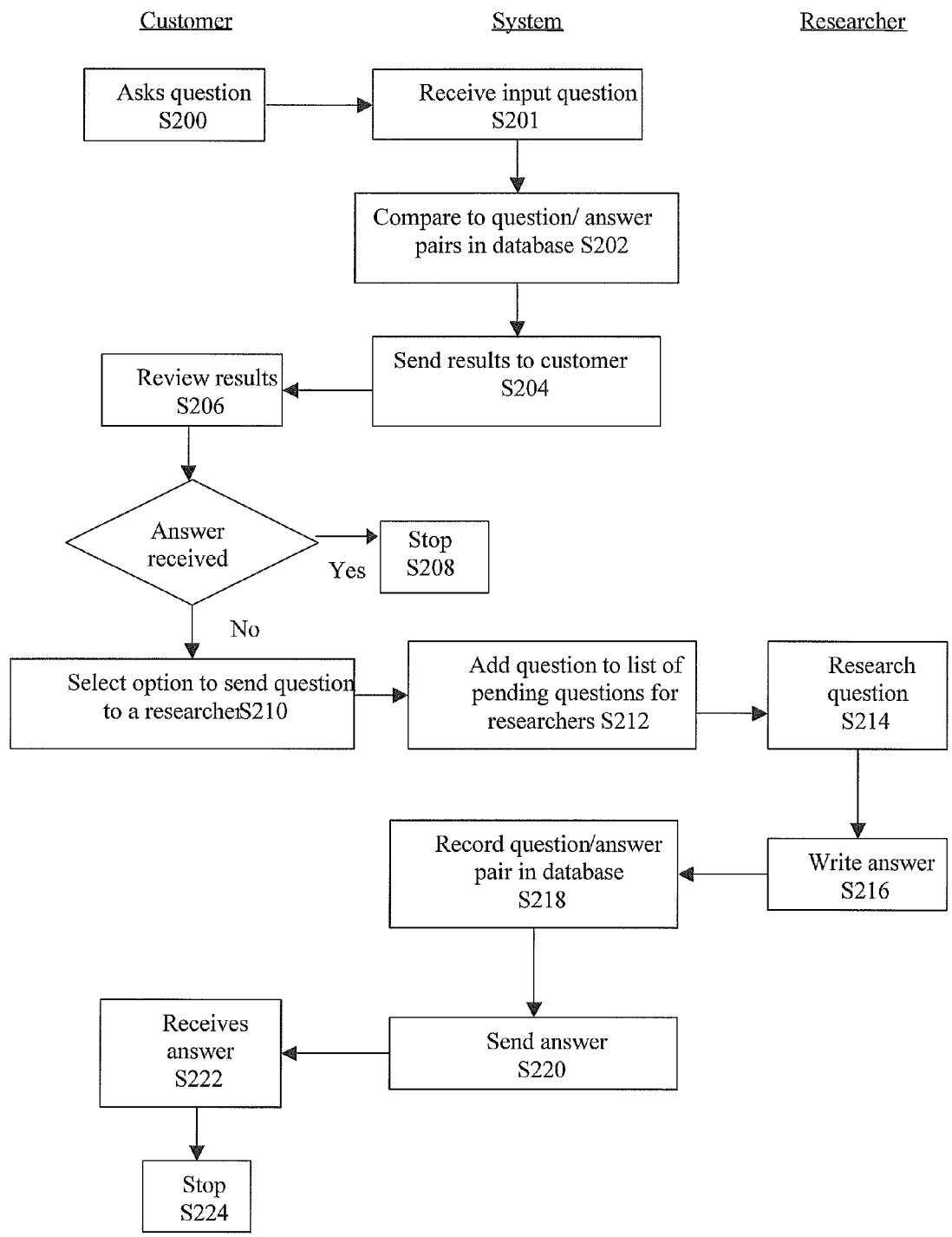
FIG. 10a is a flowchart showing an alternative process for automatically answering a question where possible.

At step S200 of FIG. 10a, a customer (or questioner) asks a question which is received by the system at step S201. At step S202, an attempt is made to match the question to question/answer pairs stored in the system. At step S204, all matches identified by the matcher are returned to the user which are reviewed by the user at step S206. If the list of question/answer matches provides the answer required by the questioner, no human involvement is required and the process stops at S208. However, in the initial stages of formation of the database, no matches may be found. Alternatively, the matches returned may not be adequate for the user. For example, some types of question depend upon "current information", e.g. "What is tomorrow's weather forecast?". Although it is very likely that this question has already been asked and a number of matching Question/Answer pairs will be returned, it is very unlikely that the answers will be correct. Accordingly, at step S210 the user selects the option to deliver the question to a researcher.

At step S212 the system receives the request to deliver the question to a researcher and adds it to a queue of pending questions for researchers. The question is then sent to a researcher by the system and the researcher researches e.g. using textbooks, internet or other similar sources, an answer to the question at step S214 and writes an answer at step S216. At step S218, the question/answer pair is recorded in the database. A record of the source used to construct the answer may also be retained. The source used to construct a particular question/answer pair is likely to form a good starting point for researching a similar question. The question/answer pair is sent to the database at step S220 and received by a questioner at step S222 and the system stops at step S224.

Figure 10B:
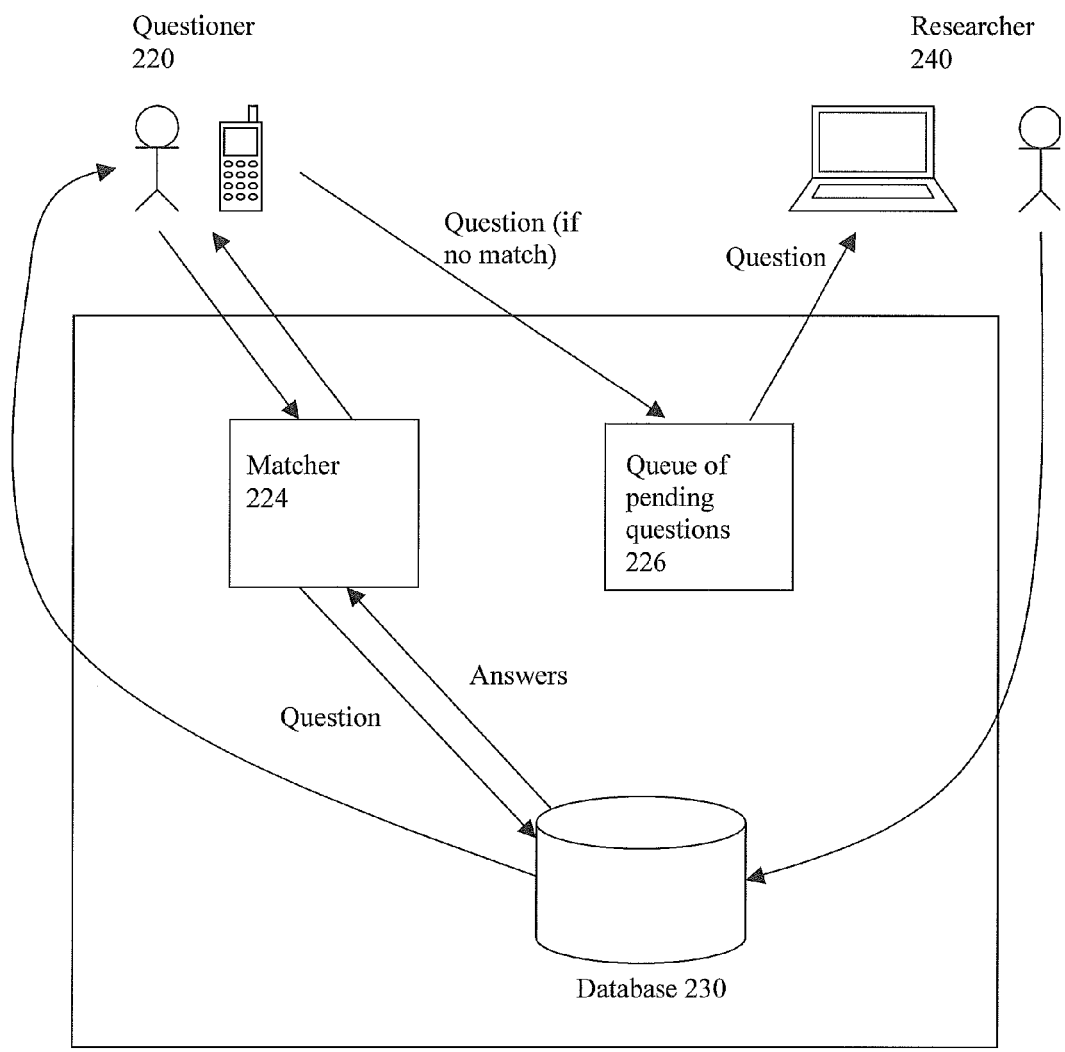
FIG. 10b is a schematic drawing of the overall system architecture for the process of FIG. 10a, FIG. 11 is a schematic illustration of a mobile device user interface for use in the process of FIG. 10a for entering a question.

FIG. 10b shows the overall system architecture implementing the methods described in FIGS. 10a. A questioner 220 sends a question (in this case using a mobile phone network) to the system. The question is sent to a matcher 224 which matches the incoming question against question/answer pairs stored in a database 230. If there are any matching question/answer pairs, the matching question/answer pairs are sent direct from the database 230 to the questioner 220.

As explained above, there are numerous possible matching algorithms. For example, the database may comprise the following linked question/answer pair:

Q: What did the lead singer of Queen die from?
A: Freddie Mercury, lead singer of Queen, died of AIDS-related bronchial pneumonia.

This linked question/answer pair would match the incoming question "What did Freddie Mercury die from?". However, if questions were only compared with questions, there would be no match between these two questions.

If none of the match results answer the users' question or no matching pairs are returned, a user can utilise the "Ask a Researcher" option, The question is added to the queue of pending questions 226 on the server for examination by a human researcher 240 as described above. After the researcher has constructed an answer to the question, a new Question/Answer pair is added to the database 230 and the answer transmitted to the user's mobile device. Many transports can be used to transmit this answer to the user's mobile device, but the fact that the human researcher may take a while to construct the answer means that an asynchronous mechanism such as SMS may be most appropriate.

Figure 11:
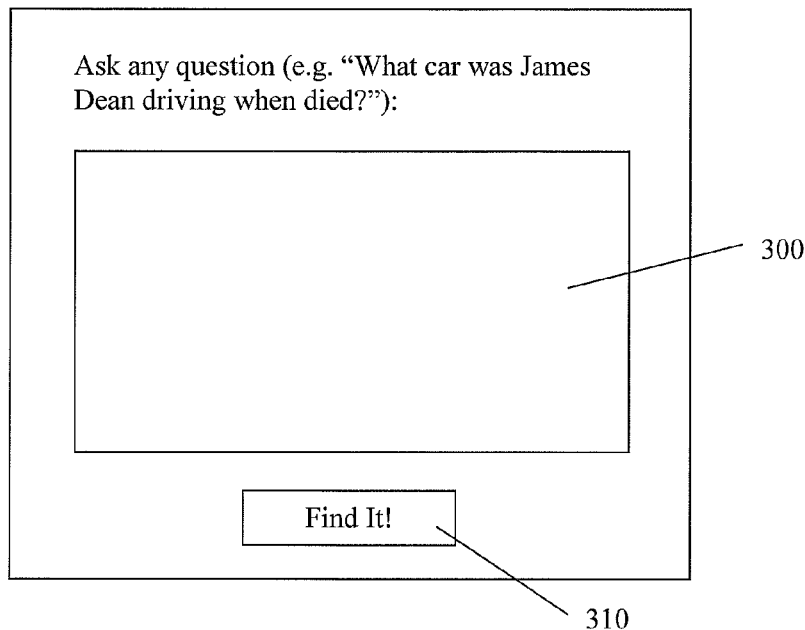

FIG. 11 is a sample user interface into which the user enters a question into box 300. This interface might be implemented as an application installed on the mobile device, via a mobile web page, or any other mechanism. After entry, the user clicks on the button "send it" 310 to send the question and the question is transmitted to the server.

Figure 12:
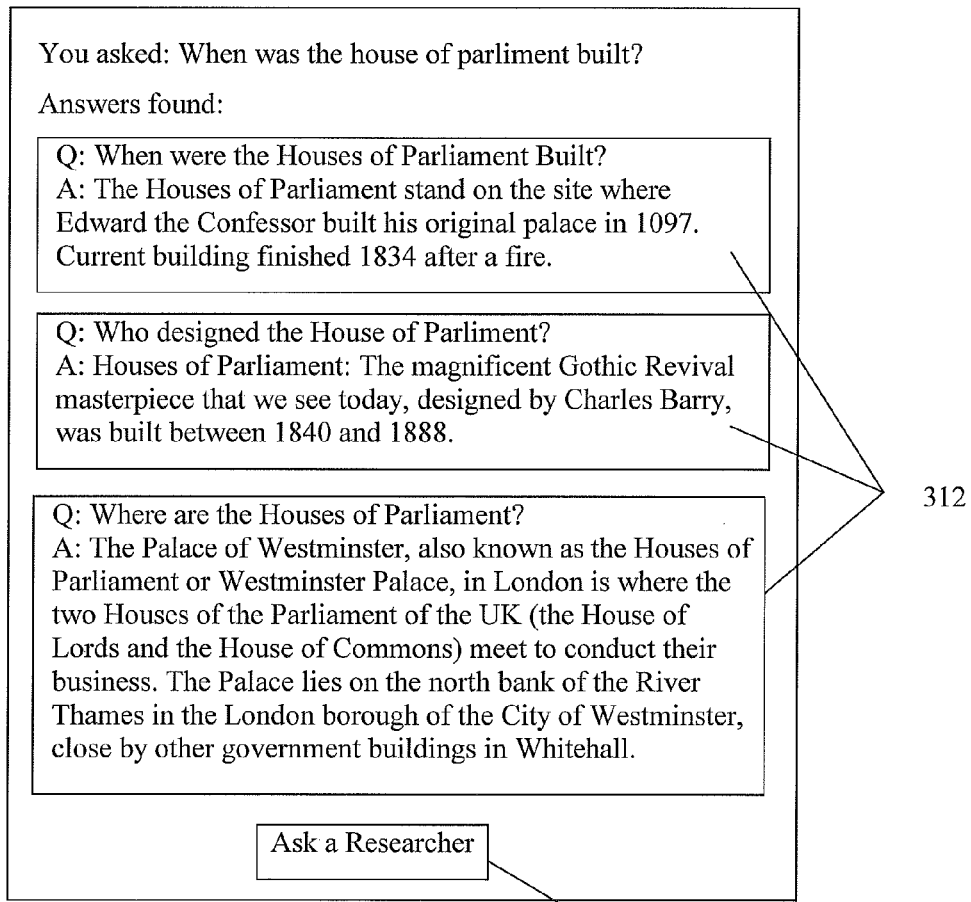
FIG. 12 is a schematic illustration of a mobile device user interface for use in the process of FIG. 10a for presenting various question and answer pairs.

An example of an interface displaying the match results is shown in FIG. 12. The question asked by the questioner is shown at the top of the interface and a list of question/answer pairs 312 returned by the matcher is shown below the original question. If none of these question/answer pairs is appropriate, a user may click on the "ask a researcher" button 314 to send the question to a queue of pending questions as previously described.

As with the system described in relation to FIGS. 1 to 9, over time, the system will create an increasingly large corpus of question/answer pairs which can be automatically returned to a questioner. Furthermore, by automatically answering such frequently asked questions, it is possible to have a disproportionately large effect on the number of questions which are answered automatically. As before, the subset of questions to which the system shown in FIGS. 10a to 12 is applicable is those for which the answer is not time-sensitive (i.e. the correct answer to the question yesterday will be the correct answer today).

Figure 13:
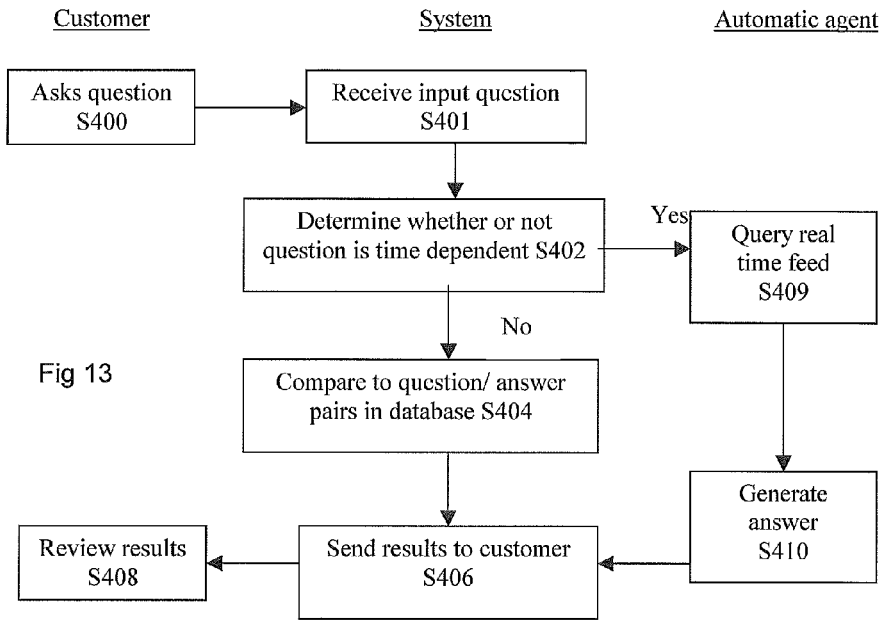
FIG. 13 is a flowchart showing an alternative process for automatically answering a question where possible.
Figure 14:
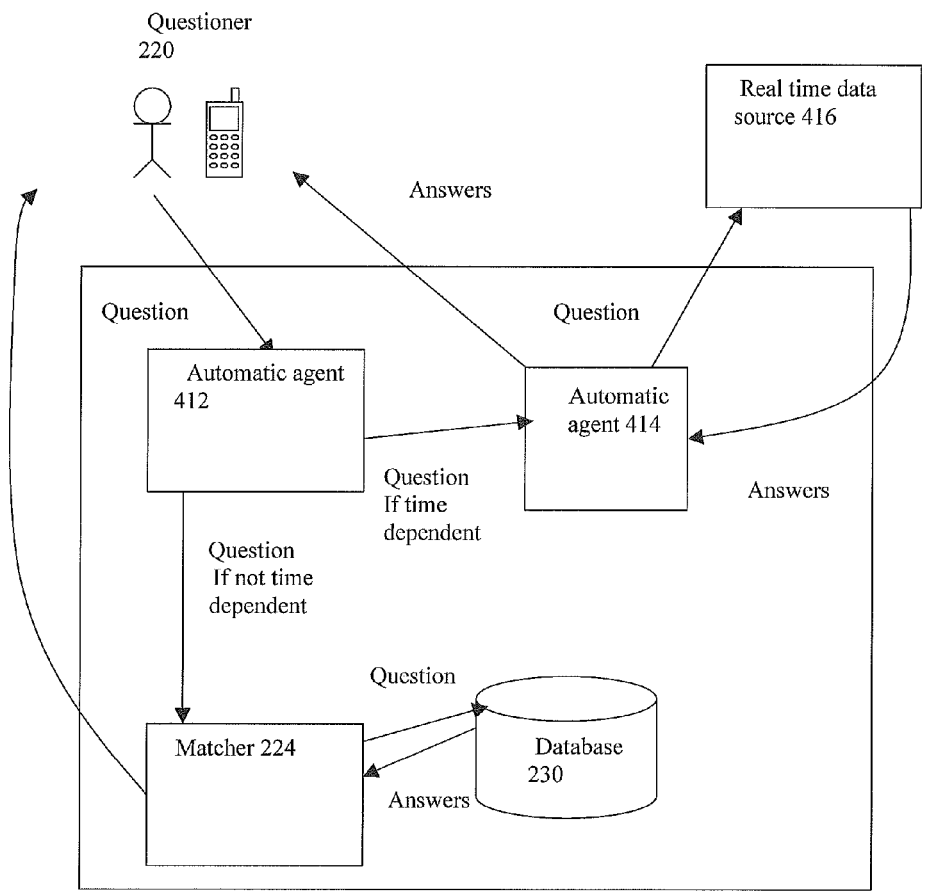
FIG. 14 is a schematic drawing of the overall system architecture for the process of FIG. 13.

FIGS. 13 and 14 illustrate an embodiment of the invention which is adapted to automatically handle such time-dependent questions. The subset of these questions which are time-dependent may be handled by creating a number of "automatic agents" which address common question types. These agents use Natural Language Parsing (NLP) techniques to extract relevant query data from the questions and then query real-time data feeds to generate up to date answers. Examples might include questions about the weather, financial markets, sports results and so on.

Presented with a particular question, existing Natural Language Parsing systems typically generate a number of different parses—different ways in which the question can be interpreted which are consistent with the rules of natural language. These parses are then ranked according to which are the most likely. The corpus of existing questions can be used to train these automatic agents to rank these parses according to the actual usage patterns of real users, increasing their accuracy. In addition, new parses can be derived to handle situations in which real-word language varies from more traditional usage (mobile users often use more informal language, including the very compact and stylized "txtspk" http://en.wikipedia.org/wiki/SMS_language).

FIG. 13 shows the process and FIG. 14 a schematic of the overall system architecture. In FIG. 13, at step S400, a customer (or questioner) asks a question which is received by the system at step S401. At step S402, the system determines whether or not the question is time dependent. If the question is not time dependent an attempt is made to match the question to question/answer pairs stored in the system at step 404.

If the system determines that the question is time dependent, an automatic agent in the system sends, at step 409, a query to the appropriate real-time feed for such information and generates the relevant answer at step 410. All results are returned to the user at step 406 and are reviewed by the user at step S408.

As in the previous embodiment, if the list of question/answer matches provides the answer required by the questioner, no human involvement is required and the fully automated process stops. However, if the answer is not correct, the user may select the option to deliver the question to a researcher and the researcher provides an answer as described above so the system becomes a hybrid manual/automatic system. For simplicity, the steps of referring to a researcher have been omitted from FIG. 13.

In FIG. 14, a questioner 220 sends a question (in this case using a mobile phone network) to the system. The question is sent to a first automatic agent 412 to determine whether or not the question is time dependent. The first automatic agent sends the question to second automatic agent 414 if the question is time dependent and to a matcher 224 as described above if the question is not time dependent. It will be appreciated that the functions of the first and second automatic agent may be provided by a single entity. The appropriate answer(s) are fed to the questioner either by the matcher 224 or the second automatic agent 414.

If none of the match results answer the users' question or the time dependent answer is incorrect, a user can utilise the "Ask a Researcher" option as described above. Accordingly, the system of FIG. 13 may be adapted to include a queue of pending questions on the server for examination by a human researcher as described above in relation to FIG. 10b. Alternatively, the embodiment of FIGS. 13 and 14 may be adapted to the system described in FIGS. 1 to 9 in which prototypical answers are generated. In other words, before checking whether or not a prototypical answer is stored, the system may check whether or not the question is time dependent. If the question is not time dependent, the system will attempt to find an appropriate prototypical answer. If one is not available, the system will proceed as described in relation to FIGS. 1 to 9.

Figure 15:
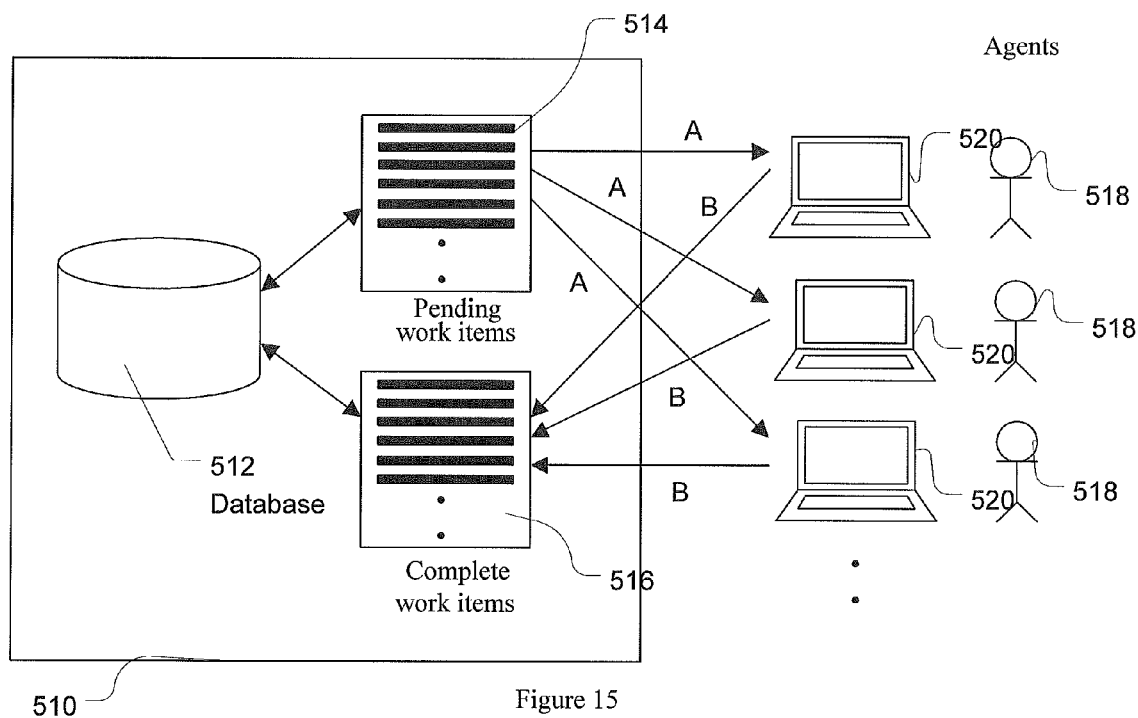
FIG. 15 is a schematic drawing of the overall system architecture for another embodiment.
Figure 17A:
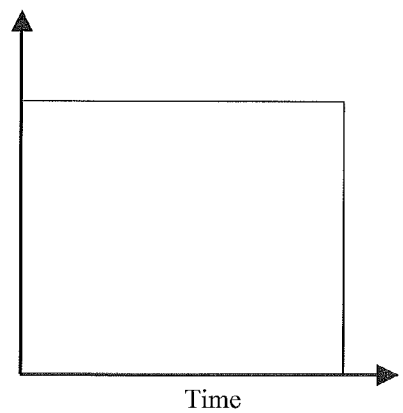
FIGS. 17a, 17b and 17c show step, linear and elliptical time decay functions.
Figure 17B:
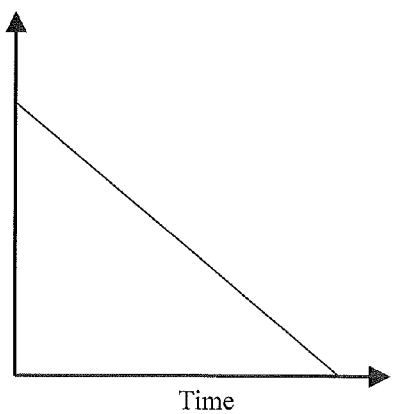
Figure 17C:
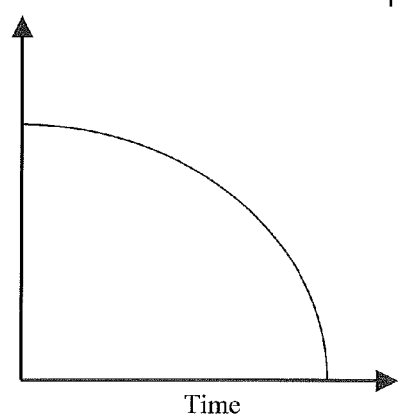

FIG. 15 shows a computer system comprising a server 510 comprising a database 512 for storing all work items, e.g. natural language questions, submitted to the system. The work items to be dealt with are stored in a folder of pending work items 514 and the completed work items in a folder of complete work items 516. A plurality of researchers 518 (agents) are in communication with the server 510 via individual personal computers or work stations 520 and a communications network, e.g. Internet or the like. Each researcher performs the following steps:
1. As shown by arrows A, each researcher 518 views the list of pending work items 514 (or a subset thereof).
2. Each researcher 518 selects a work item from the list (at which point it becomes unavailable for any other agent).
3. Each researcher 518 works on his own selected work item and when completed, sends the answer to the list of completed work items 516 as shown by the arrows B.
4. The researcher then begins the process again by returning to step 1.

FIG. 16 shows an example of work item unpopularity evolving over time using a simple algorithm which is implemented by the server. At the first stage, three of six pending work items are presented to an agent. All work items initially have an unpopularity value of 0. The agent selects work item C. According to the algorithm, all work items above the selected item have their unpopularity increased by 1, i.e. work items A and B have their unpopularity increased to 1. The unpopularity of the work items below the selected work item is unchanged at zero.

At the second stage, four of the five pending work items are presented to the agent. Three of the presented work items (D to F) have an unpopularity score of 0 and one work item (A) has a score of 1. Work item B is not presented because it has been selected by another agent. The agent selects work item E. Applying the algorithm again, all work items above the selected item have their unpopularity increased by 1, i.e. work item A has its unpopularity score increased to 2 and work item D has its unpopularity score increased to 1. The unpopularity of the work items below the selected work item is unchanged at zero.

The server also calculates an agent's personal unpopularity score as a time-weighted combination of the unpopularity scores of the work items selected by that agent in the past. The scores are combined according to a time decay function. FIGS. 16a to 16c show various different time decay functions which may be used:
FIG. 16a shows a step function (e.g. all work items selected in the last hour count equally, no work items selected before then count at all)
FIG. 16b shows a linear decay function (e.g. work items selected in the last 60 minutes ago are combined with a weight of 1-t/60 where t represents time).
FIG. 16c shows an elliptical decay function The list of decay functions shown in FIGS. 16a to 16c is not exhaustive. Other decay functions may be used, e.g. other complicated decay functions such as exponential etc.

An example of calculating an agent's unpopularity score from the list of answered questions is set out below:
Agent worked on:
Work item A (unpopularity 10) from 15 minutes ago until now.
Work item B (unpopularity: 0) from 30 minutes ago until 15 minutes ago.
Work item C (unpopularity: 5) from 45 minutes ago until 30 minutes ago.
Work item D (unpopularity: 0) from 50 minutes ago until 45 minutes ago.
Work item E (unpopularity: 20) from 60 minutes ago until 50 minutes ago.
Work item F (unpopularity: 10) from 70 minutes ago until 60 minutes ago.
Agent's value (total unpopularity):
Using a linear time decay function 1−t/60, an agent's total unpopularity can be calculated as:

$$\sum_{items: t \leq 60} (t_2 - t_1)\left(1 - \frac{t_2 + t_1}{120}\right) U$$

where $(t_1, t_2)$ is the interval during which a work item was worked upon and U is the unpopularity of the work item.
So, for the example work history above:

$$(15 - 0)\left(1 - \frac{15 + 0}{120}\right)10 +$$
$$(30 - 15)\left(1 - \frac{30 + 15}{120}\right)0 + (45 - 30)\left(1 - \frac{45 + 30}{120}\right)5 +$$
$$(50 - 45)\left(1 - \frac{50 + 45}{120}\right)0 + (60 - 50)\left(1 - \frac{60 + 50}{120}\right)20 =$$
$$131.25 + 0 + 28.125 + 0 + 16.667 = 176.042$$

An agent's current level is the ratio of their current unpopularity score to the average of all currently working agents unpopularity scores. Thus if the average level of all agents working is 124.065, this would give this agent a current level of 1.42:1, i.e. 142%

FIG. 18 shows an example of a user interface in which an agent's value (level) is displayed as a percentage. The level may be displayed in a number of alternative ways including (but not limited to):

Numerically (e.g. "Your current level is 23.6, compared to an average level of 12.4")

As a ratio (e.g. "Your current level is 1.2:1")

As a normalized percentage, where 50% represents an "average" level (e.g. "Your current level is 34%").

Graphically (e.g. as a "traffic light" display with green indicating a level at or above the average, amber indicating below average and red indicating far below average)

FIG. 18 also shows the work item unpopularity displayed graphically with a "smiley face" icon indicating that selecting the work item would increase the agent's level, a "laughing face" icon indicating that selecting the work item would increase the agent's level significantly and the lack of face indicating that the work item has an unpopularity level of zero.

This work item unpopularity may alternatively be displayed in a number of different ways including (but not limited to):

Numerically (e.g. "Unpopularity: 5")

As the effect they would have on the agent's level (e.g. "Selecting this work item will increase your level to 12.2").

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A computer system for automatically answering natural language questions, the system comprising:
   an input module to receive said natural language questions;
   a server configured to receive said natural language questions to be answered to a plurality of researchers, wherein said server assigns unpopularity scores to each of said natural language questions;
   a plurality of researcher work stations each having an researcher user interface, and a communications network connecting said server to said plurality of researcher work stations, wherein each researchers user interface presents a plurality of said natural language questions to one of said plurality of researchers and wherein said server is configured to assign a value to each researcher based on the unpopularity score of each natural language questions selected by said researcher;
   a data store to record linked pairs of questions and corresponding answers;
   a system to link pairs of questions and corresponding answers into groups, to enable the generation of a prototypical answer that answers each question from said pairs of questions and answers in said group, and to store said prototypical answers in said data store;
   a matcher configured to compare a said received natural language question with a question in said data store having an associated prototypical answer and outputs said associated prototypical answer for said question in response to said matching.

2. A computer system according to claim 1, wherein said system to link pairs of questions and corresponding answers is configured to construct a disconnected direct graph of said pairs of questions and corresponding answers.

3. A computer system as claimed in claim 1, wherein said system to link pairs of questions and corresponding answers includes a moderator user interface which is configured to present said groups of pairs of questions and corresponding answers to a moderator for review to generate said prototypical answer and which is configured to input said prototypical answer to said data store to store said prototypical answer in association with said group of pairs of questions and corresponding answers.

4. A computer system as claimed in claim 1, wherein said matcher is configured to output all linked question and answer pairs which match said received natural language question.

5. A computer system as claimed in claim 4, wherein said matcher further comprising an input to receive a request to transmit a specific natural language question to a researcher and wherein said matcher is further configured to output said specific natural language question to a researcher in response to said request.

6. A computer system according to any one of the preceding claims, further comprising a researcher user interface to present a said natural language question to a researcher and to present an input box for a researcher to input an answer to the presented natural language question.

7. A computer system according to claim 1, wherein said data store stores a record of a source used to generate each linked pair of question and answer and wherein said system may output a said record of said source used to generate each linked pair of question and answer, together with the associated linked pair of question and answer.

8. A computer system as claimed in claim 1, which is configured to determine whether a question received by the system is time dependent.

9. A computer system as claimed in claim 8, further comprising means to query a real-time data feed to generate an answer to a time dependent question.

10. A computer system as claimed in claim 8, wherein a natural language parsing system is used to determine whether a question is time dependent.

11. A computer system according to claim 1, wherein the server is configured to assign an initial unpopularity score of zero to each natural language question and subsequently increases the unpopularity score of each natural language question by tracking when a natural language question is presented to a researcher and not answered.

12. A computer system according to claim 11, wherein the unpopularity score of each natural language question is increased by determining its position in a list of work items presented to a researcher relative to a natural language questions selected by said researcher.

13. A computer system according to claim 1, wherein the server is configured to calculate said value of each researcher as a time-weighted combination of the unpopularity scores of each natural language question selected by that researcher over a particular time frame.

14. A computer system according to claim 13, wherein the server uses a modified time decay function to calculate said value as a time-weighted combination of the unpopularity scores of each work item.

* * * * *